US007764772B2

(12) United States Patent
Weksel

(10) Patent No.: US 7,764,772 B2
(45) Date of Patent: Jul. 27, 2010

(54) METHOD, SYSTEM, APPARATUS, AND COMPUTER PROGRAM PRODUCT FOR TRANSMITTING A MESSAGE

(76) Inventor: David Weksel, 1940 Carlsbad Cir., #308, Naperville, IL (US) 60563

( * ) Notice: Subject to any disclaimer, the term of this patent is extended or adjusted under 35 U.S.C. 154(b) by 951 days.

(21) Appl. No.: 11/512,162

(22) Filed: Aug. 30, 2006

(65) Prior Publication Data
US 2007/0124689 A1 May 31, 2007

Related U.S. Application Data

(63) Continuation of application No. 11/126,600, filed on May 11, 2005, now abandoned, which is a continuation of application No. 10/011,640, filed on Nov. 30, 2001, now Pat. No. 6,904,131.

(51) Int. Cl.
*H04M 15/00* (2006.01)
(52) U.S. Cl. .............................. 379/114.13; 379/88.13; 379/88.17
(58) Field of Classification Search .............. 379/88.17, 379/114.13
See application file for complete search history.

(56) References Cited

U.S. PATENT DOCUMENTS

| 5,497,373 A | 3/1996 | Hulen et al. |
| 5,559,867 A | 9/1996 | Langenskamp et al. |
| 5,608,786 A | 3/1997 | Gordon |
| 5,621,727 A | 4/1997 | Vaudreuil |
| 5,647,002 A | 7/1997 | Brunson |
| 5,675,507 A | 10/1997 | Bobo, II |
| 5,682,460 A | 10/1997 | Hyziak et al. |
| 5,742,905 A | 4/1998 | Pepe et al. |
| 5,761,201 A | 6/1998 | Vaudreuil |
| 5,761,502 A | 6/1998 | Jacobs |
| 5,825,865 A | 10/1998 | Oberlander et al. |
| 5,838,768 A | 11/1998 | Sumar et al. |
| 5,870,454 A | 2/1999 | Dahlen |
| 5,872,926 A | 2/1999 | Levac et al. |
| 5,940,478 A | 8/1999 | Vaudreuil et al. |

(Continued)

FOREIGN PATENT DOCUMENTS

WO   WO 00/76155 A1   12/2000

OTHER PUBLICATIONS

Krupa, T., "Triple play: delivering effective & key communication". Proceedings of the 29th annual ACM SIGUCCS Conference on User Services, vol. 29, pp. 73-73, 2001.

*Primary Examiner*—Simon Sing
(74) *Attorney, Agent, or Firm*—Sterne, Kessler, Goldstein & Fox, PLLC.

(57) ABSTRACT

A method for effecting delivery of a message from an originator in an original message format to a plurality of authorized receivers in a respective reception message format includes the steps of: (a) composing the message; (b) characterizing the message for addressing to indicate at least one feature of the message; (c) addressing the message according to the characterizing pursuant to information provided in a data base that identifies particulars relating to each respective authorized receiver; the addressing establishing selected receivers of the plurality of authorized receivers as permitted receivers; the particulars including the appropriate respective reception message format for each respective permitted receiver; and (d) transmitting the message to each respective permitted receiver via a communication network that includes respective communication media configured for delivering the message in the appropriate respective reception message format to each respective permitted receiver.

26 Claims, 7 Drawing Sheets

U.S. PATENT DOCUMENTS

| | | |
|---|---|---|
| 6,085,101 A | 7/2000 | Jain et al. |
| 6,157,945 A | 12/2000 | Balma et al. |
| 6,203,192 B1 | 3/2001 | Fortman |
| 6,226,668 B1 | 5/2001 | Silverman |
| 6,289,223 B1 | 9/2001 | Mukherjee et al. |
| 6,389,475 B1 | 5/2002 | Speakman et al. |
| 6,411,963 B1 | 6/2002 | Seese et al. |
| 6,430,604 B1 | 8/2002 | Ogle et al. |
| 6,438,215 B1 | 8/2002 | Skladman et al. |
| 6,606,647 B2 | 8/2003 | Shah et al. |
| 6,631,400 B1 | 10/2003 | DiStefano, III |
| 6,681,114 B2 * | 1/2004 | Chang et al. ............. 455/456.3 |
| 6,690,773 B1 | 2/2004 | Law |
| 6,904,131 B2 | 6/2005 | Weksel |
| 7,051,118 B2 | 5/2006 | Collison |
| 7,080,381 B2 | 7/2006 | Hannigan et al. |
| 7,606,401 B2 * | 10/2009 | Hoffman et al. ............ 382/124 |
| 2005/0203990 A1 | 9/2005 | Weksel |

\* cited by examiner

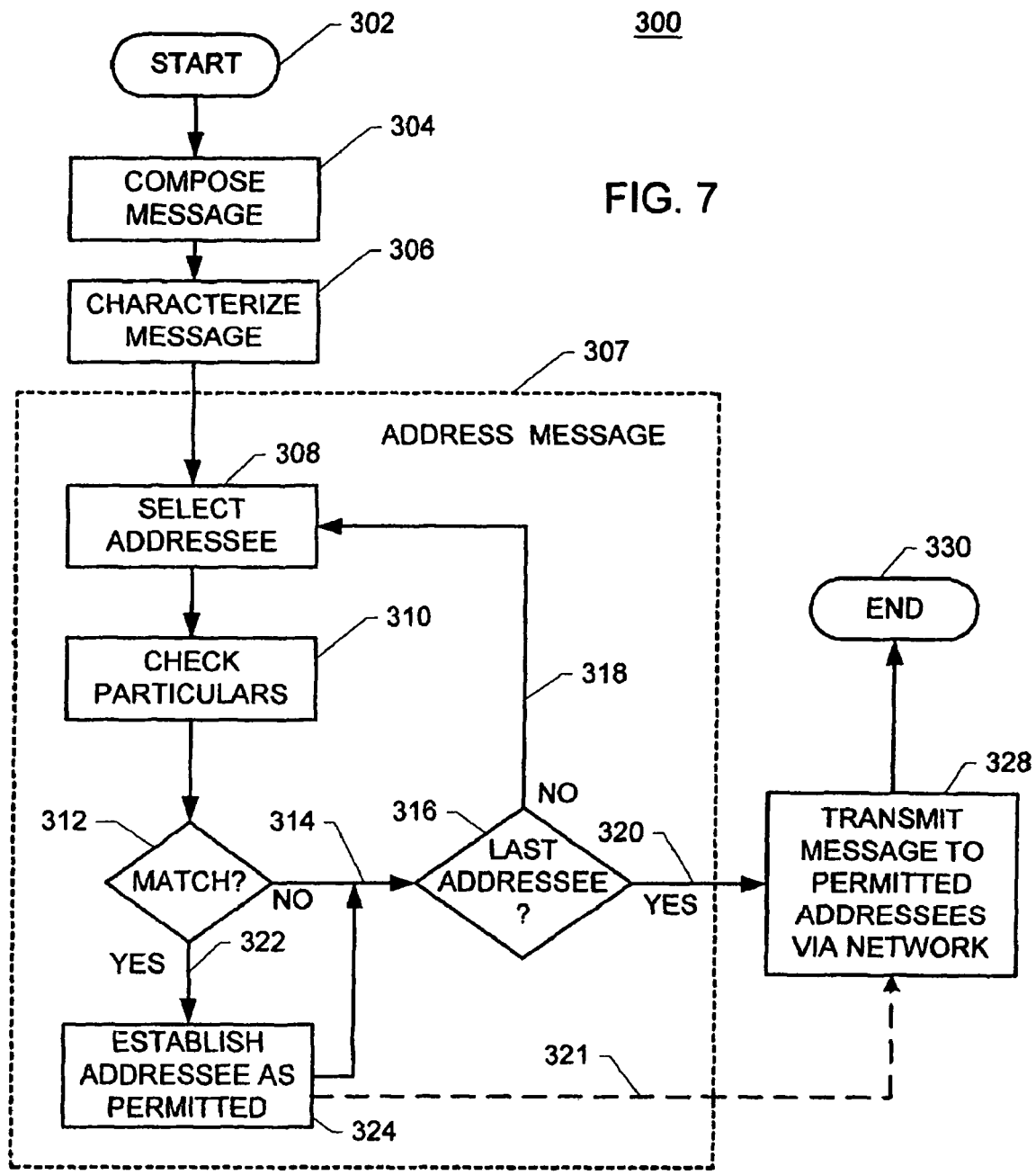

METHOD, SYSTEM, APPARATUS, AND COMPUTER PROGRAM PRODUCT FOR TRANSMITTING A MESSAGE

This application is a continuation of U.S. application Ser. No. 11/126,600, filed May 11, 2005, now abandoned which is a continuation of U.S. application Ser. No. 10/011,640, filed Nov. 30, 2001, now U.S. Pat. No. 6,904,131.

BACKGROUND OF THE INVENTION

The present invention is directed to systems and methods for message delivery in communication networks, and especially to systems and methods for message delivery in telecommunication networks.

Various commercial establishments have occasions for communicating with a plurality of addressees in order to convey a message to the intended message recipients. For example, a merchant may wish to apprise potential customers of a sale event at one or more locations in a geographical area.

By way of example, retail establishments such as supermarkets, golf courses, movie theaters, and others, often communicate with customers by sending notices or advertisements through the postal service or another mail delivery service. The communications may be printed notices or advertising circulars, and may be in an electronic medium such as a floppy disc, a CD-ROM or DVD or other machine readable format. Mailing through a mail delivery service has the desirable attribute of enabling communications from one-to-many. Hereinafter in this description, the term "one-to-many" refers to one originator entity substantially simultaneously communicating with a plurality of receiving entities. In the retail example described above, one retail establishment (the originator entity) communicates with many customers or other consumers (the receiving entities) by mailing information concerning advertisements, sales or other promotions or communiqués. There is a disadvantage in terms of timeliness involved in such mail delivery of communications: because of the time required for sorting and delivering the mail, two to five days or more may elapse before receiving entities receive the communication. Advertisers may wish to offer "perishable" goods or services so that timely communications are a necessity. For example, theater tickets are a perishable offering. If a movie theater seat is not sold for a particular showing, the opportunity to realize revenue from that seat for that particular showing is lost; it is perishable. There are other examples of perishable products and services where retail establishments may want to promote perishable items to customers within certain time frames. Timely communication of opportunities to customers may require sending communications and getting a response from customers within hours, not the days that are usually involved when using the postal service. There are express mail and messenger services available for shortening delivery and response times, however such specialized services are often cost prohibitive.

Mailed communications also are generally the same for receiving entities in a given Zip Code or other geographic area. There is usually no (or little) consideration given to an individual receiving entities' likes, dislikes or other preferences in preparing a communication mailing. A significant consequence of such a generalized message is a low response and redemption rate. That is, customers often simply ignore or discard communications without even reading them because of a perception that the communications are not something that would be of interest.

Another disadvantage of mailed communications has been safety; the mails have been used as a vehicle for terrorism. Mail recipients have fallen victim to explosives and toxins that have been unlawfully enclosed in their mail. Mail communication campaigns are also susceptible to the possibility of cross contamination among mail pieces so that toxins or other mail mischief carried by one piece of mail may pass a noxious characteristic to other mail pieces during normal mail sorting and handling operations. As a consequence, receiving entities affected by the objectionable mail may be multiplied several-fold.

In summary, there are at least three aspects of mailed communications for conveying commercial messages that can be improved: timeliness, responsiveness, and safety.

Advances in technology and telecommunication systems have been employed to address these shortcomings. In 1876 Alexander Graham Bell was credited with inventing the telephone and creating the means for one-to-one voice communications over a distance. Since then, advances in communications and electronics have made communications possible throughout most of the world. For example, the Global Standard for Mobiles (GSM), the European standard that emerged circa 1991, includes provisions for one-to-one text messaging to and from wireless handsets. This GSM standard uses a store and forward system for short messages. In addition, since the development of the Internet, email, voice over Internet protocol, instant messaging, and other messaging techniques are becoming popular communications vehicles.

Retail establishments may opt to use telephone systems, email, facsimile, mobile and other communication media to communicate with customers or prospective customers. These various communication media also provide a means for one to communicate to many in real or near real time. One-to-many communications require the flexibility to simultaneously address a variety of the many media available.

Communication systems and methods with one-to-many capabilities have been proposed. In U.S. Pat. No. 6,289,223 to Mukherjee, et al for "System and Method for Selective Multipoint Transmission of Short Message Service Messages," issued Sep. 11, 2001, a system and method are disclosed which contemplate the transmission of short message service (SMS) messages to a plurality of destination units by transmitting an SMS message addressed to a predefined user group. Mukherjee discloses a system and method for carrying out message transmission from one-to-many in an SMS format. Mukherjee discloses a system and method by which a message originator enters a desired message and then initiates an SMS transmission by entering a user group identifier in place of an individual recipient's identifier. Using a properly defined user group that includes a data base of one or many SMS identifiers allows the transmission of the desired message from one SMS capable device to many SMS capable mobile units. However, Mukherjee's invention provides only for delivery to SMS capable mobile units. In addition, there is no consideration for the tastes or preferences of message recipients.

Thus, prior art communication systems and methods do not accommodate customer preferences, and usually one is limited to a single communication medium in carrying out the distribution of a message. That is, sending a facsimile communication is received by those customers or prospective customers that are equipped to receive facsimile messages. Other types of communication are destined for reception by receiving entities that are equipped to receive the communication format used by the originator entity in transmitting the message.

There is a need for a communication system and method that enables real or near real time communications using a variety of communication media that conform to receiving entities' communication capabilities.

There is a need for a communication system and method that also accommodates receiving entities' preferences as to various aspects of the messages, such as originator of the messages, content of the messages, and other characteristics of the messages.

There is a need for a communication system and method that facilitates communication on a one-to-many basis with diverse populations with different tastes and requirements for products, services, and communication media.

Preferably, recipients may elect to receive communications via a plurality of media. Such a plurality of media may include, by way of example and not by way of limitation, voice, data or video communications. The technology to support the delivery of messages includes, but is not limited to, voice terminals (for example: publicly switch telephone services, mobile voice terminals, voice over Internet protocol), emails, faxes, pages, short message services, instant messages, enhanced messaging services, multimedia messaging services, video conferences.

SUMMARY OF THE INVENTION

The present invention provides a system and method for communication that enables the broadcast of messages from a single originating interface to a plurality of selected recipient-specified message terminal elements. In a preferred embodiment of the invention, the recipients subscribe to a service that facilitates defining recipient preferences and communication media capabilities. In the preferred embodiment of such a subscription process, recipients provide specific terminal requirements, including network connectivity, and delivery rules. In addition, message originators and recipients may indicate criteria to authorize filtering and delivery of messages. When the criteria are met, the messages are transmitted according to the delivery rules. Data bases containing information provided by subscribers during the subscription process and other attributes may be maintained in a service bureau.

In a particularly preferred embodiment of the invention, recipients can request subscription changes via the Internet using Internet protocols such as hypertext transport protocol and extensions.

A method for effecting delivery of a message from an originator in an original message format to a plurality of authorized receivers in a respective reception message format includes the steps of: (a) composing the message; (b) characterizing the message for addressing to indicate at least one feature of the message; (c) addressing the message according to the characterizing pursuant to information provided in a data base that identifies particulars relating to each respective authorized receiver; the addressing establishing selected receivers of the plurality of authorized receivers as permitted receivers; the particulars including the appropriate respective reception message format for each respective permitted receiver; and (d) transmitting the message to each respective permitted receiver via a communication network that includes respective communication media configured for delivering the message in the appropriate respective reception message format to each respective permitted receiver.

It is therefore an object of the present invention to provide a communication system and method for effecting delivery of a message from an originator in an original message format to a plurality of authorized receivers in real or near real time communications using a variety of communication media that conform to receiving entities' communication capabilities.

It is a further object of the present invention to provide a communication system and method for effecting delivery of a message from an originator in an original message format to a plurality of authorized receivers in a respective reception message format that also accommodates receiving entities' preferences as to various aspects of the messages, such as originator of the messages, content of the messages, and other characteristics of the messages.

It is yet a further object of the present invention to provide a communication system and method for effecting delivery of a message from an originator in an original message format to a plurality of authorized receivers in a respective reception message format that facilitates communication on a one-to-many basis with diverse populations with different tastes and requirements for products, services, and communication media.

It is still a further object of the present invention to provide a communication system and method for effecting delivery of a message from an originator in an original message format to a plurality of authorized receivers in a respective reception message format with which recipients may elect to receive communications via a plurality of media. Such a plurality of media may include, by way of example and not by way of limitation, voice, data or video communications. The technology to support the delivery of messages includes, but is not limited to, voice terminals (for example: publicly switch telephone services, mobile voice terminals, voice over Internet protocol), emails, faxes, pages, short message services, instant messages, enhanced messaging services, multimedia messaging services, video conferences.

Further objects and features of the present invention will be apparent from the following specification and claims when considered in connection with the accompanying drawings, in which like elements are labeled using like reference numerals in the various figures, illustrating the preferred embodiments of the invention.

BRIEF DESCRIPTION OF THE DRAWINGS

A more complete understanding of this invention may be obtained from consideration of the following description taken in conjunction with the drawings in which:

FIG. 7 is a flow chart illustrating a second embodiment of the message broadcast method of the present invention.

DETAILED DESCRIPTION OF THE PREFERRED EMBODIMENT

The present invention described hereinafter, with references to the accompanying drawings, is a preferred embodiment of the invention in connection with messaging between an originator and a plurality of receivers embodied in a representative milieu of messaging between retail establishments and customers. However, the application of this invention is much broader than the illustrative system and method and should not be considered as limited to the embodiments described herein.

Figure 1:
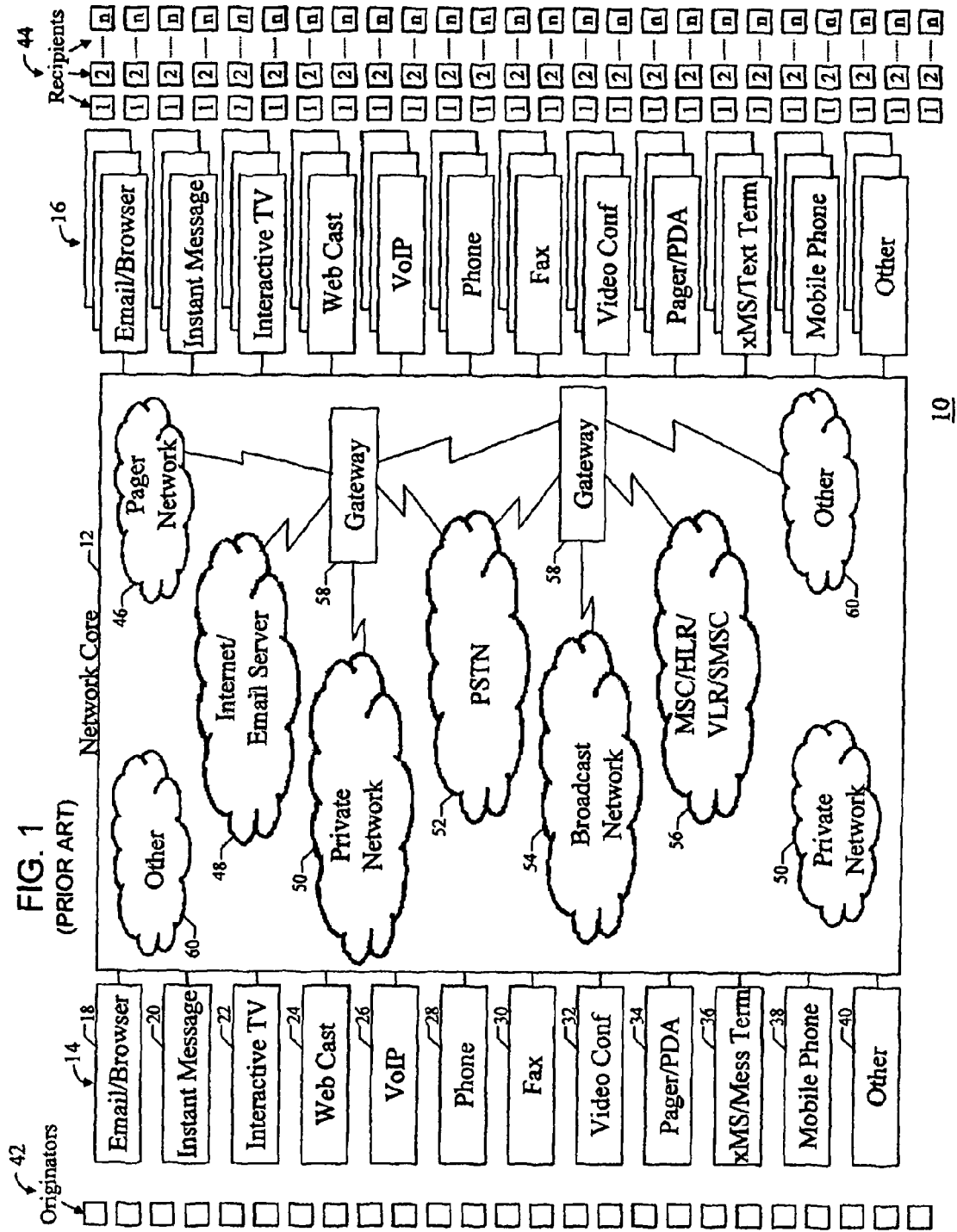
FIG. 1 is a schematic block diagram of a prior art arrangement of disparate communication systems that provide one-to-one and one-to-many communications.

FIG. 1 is a schematic block diagram of a prior art arrangement of disparate communication systems that provide one-to-one and one-to-many communications. In FIG. 1, a prior art message broadcast communication system (MBCS) 10 enables message originators 42 (e.g., retail establishments) to broadcast messages on a one-to-one and one-to-many basis to recipients 44 (e.g., customers or consumers). A respective recipient 44 may receive message traffic for 1, or 2 or n number of customers or consumers.

MBCS 10 includes a network core 12 connected with a plurality of message origination elements 14 and a plurality of message termination elements 16. Message origination elements 14 include, for example, an email/browser 18, an instant message unit 20, an interactive TV unit 22, a web cast unit 24, a VoIP (voice over Internet protocol) unit 26, a telephone unit 28, a facsimile unit 30, a video conference unit 32, a pager/PDA (personal digital assistant) unit 34, an xMS/message terminal (xMS encompasses short message services, enhanced message services, and multimedia message services) 36, a mobile telephone 38, and other message origination elements 40.

Network core 12 components include a pager network 46, an Internet/email server 48, a plurality of private networks 50, a PSTN (public switched telephone network) 52, a broadcast network 54, a MSC/HLR/VLR/SMSC (mobile switching center/home location register/visitor location register/short message service center) facility 56, a plurality of gateways 58, and other network core components 60.

The architecture of MBCS 10 is fragmented by its very nature with a plurality of incompatible message origination elements 14, network core 12 components, and message termination elements 16. There is some limited compatibility among the various system elements in MBCS 10, but a message originator such as a retail establishment must compose different broadcast messages, with different formats and form factors, and obtain separate network connectivity for each respective incompatible system element or component to effect message delivery to all recipients 44.

Another significant shortcoming of prior art MBCS 10 is the lack of a capability for accounting for tastes of respective message recipients 44. That is, recipients 44 do not have an opportunity to indicate desired attributes of message content. Message originators 42 may broadcast messages to the entire audience of recipients 44 without regard to the ideal target profile of message content desired by respective recipients 44. For those recipients 44, that are not interested in a given particular message, the value of future messages is diluted, even if the future messages would ordinarily be of interest to a given recipient 44. An additional benefit that could be realized if such tailoring of message content for respective recipients 44 could be effected is an improvement in efficiency of promulgating broadcast messages (i.e., one-to-many messages) by streamlining cost structures and productivity.

Figure 2:
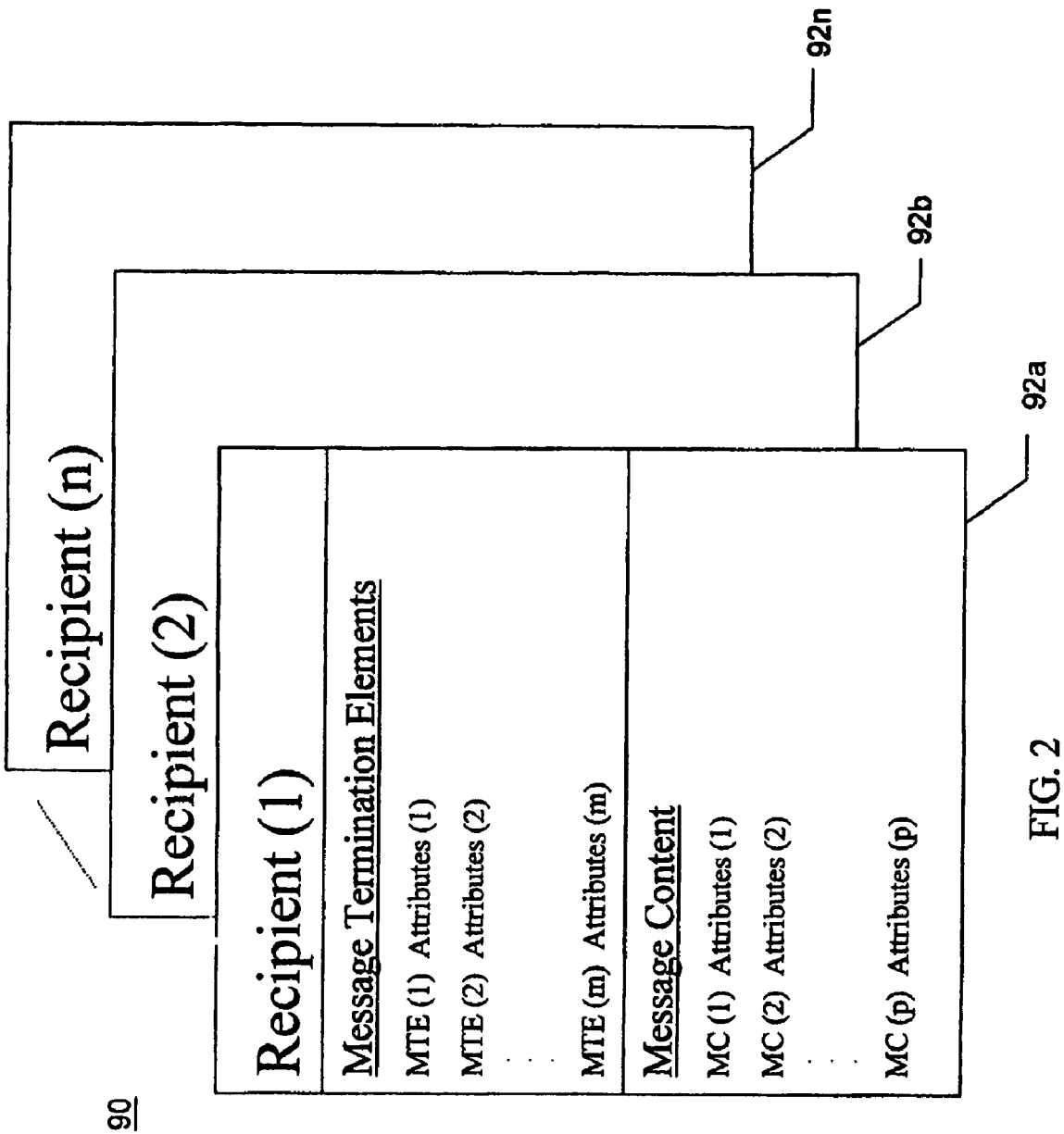
FIG. 2 is a schematic representation of an exemplary subscription data base for use with the present invention.

FIG. 2 is a schematic representation of an exemplary subscription data base for use with the present invention. In FIG. 2, an exemplary subscription data base 90 contains records that comprise a repository of recipients' tastes or particulars in a plurality of data base entries 92a, 92b, 92n. A data base entry 92a records message termination elements (i.e., message formats) that can be handled by recipient (1). Data base entry 92a also records message content preferences that are desired by recipient (1). A data base entry 92b records message termination elements (i.e., message formats) that can be handled by recipient (2). Data base entry 92b also records message content preferences that are desired by recipient (2). A data base entry 92n records message termination elements (i.e., message formats) that can be handled by recipient (n). Data base entry 92n also records message content preferences that are desired by recipient (n). Information may be entered into subscription data base 90 by recipients pursuant to access granted to subscription data base 90 by a subscription process. That is, recipients (n) may pay a subscription fee for the privilege of having appropriate information 92n recorded in subscription data base 90 for use with the system and method of the present invention to effect delivery of messages from message originators to message recipients. In such manner, desires or preferences of subscribing recipients may be stored and later employed in practicing the present invention for effecting broadcast messaging (i.e., one-to-many) transmission among a plurality of recipients who receive the message by differing message termination elements in different message formats.

The annotation "n" is intended to indicate that subscription data base 90 can accommodate any number of recipients (n) in a like number of data base entries 92n. As mentioned above, subscription data base 90 is exemplary; the particular structure of the data base used to record customer or recipient preferences is not restricted or limited to the form or format described herein. Any data base structure that permits storage and recovery of information relating to message termination element attributes, message content attributes or other preferences or desires of subscribing recipients is appropriate for use in implementing the system and method of the present invention.

By way of example and not by way of limitation, message termination element attributes may include element type, network connectivity, and time of transmission. Some specific examples of message termination element attributes: SMS messages (element type) at phone number 630.555.5540 by Cingular Wireless (network connectivity) and Monday to Wednesday from 3 pm to 8 pm (time of transmission). By way of example and not by way of limitation, message content attributes may include specific message content. Some specific examples of message content attributes: action-adventure movies (movie genre), Clint Eastwood (leading actor), 10% discount (pricing incentive).

Figure 3:
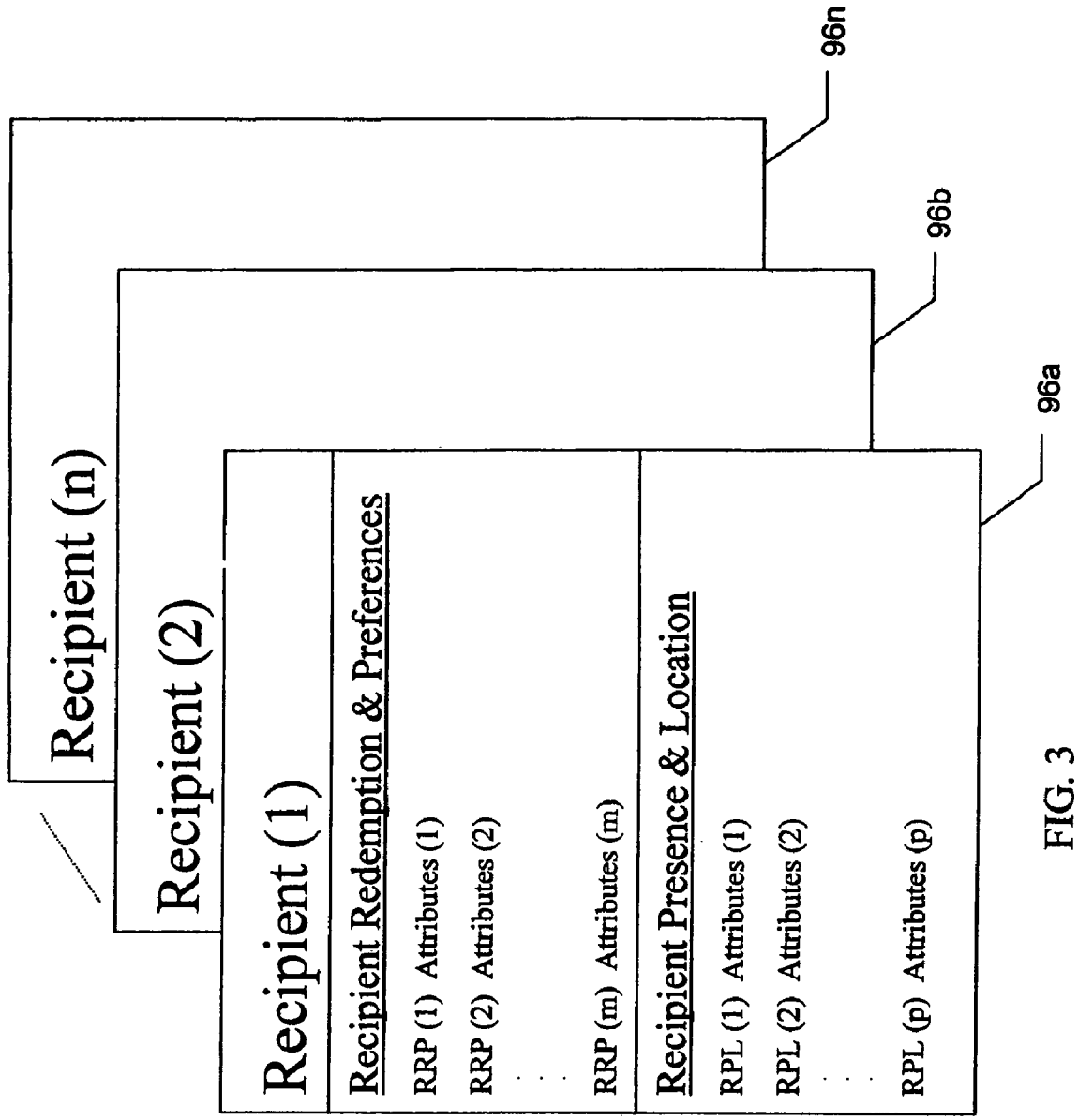
FIG. 3 is a schematic representation of an exemplary embodiment of an originator data base for use with the present invention.

FIG. 3 is a schematic representation of an exemplary embodiment of an originator data base for use with the present invention. In FIG. 3, an originator data base 94 contains records that comprise a repository of recipients' buying habits and other attributes that allow message originators to target the broadcast of messages in a plurality of data base entries 96a, 96b, 96n. A data base entry 96a records redemption and preference attributes for a recipient (1). Redemption and preference attributes may, for example, indicate the desires of a recipient regarding rebates terms or coupon discount terms. Message may include coupons or other redeemable promotions, and such attributes may also indicate a historical account of the messages that have been redeemed in the past for each recipient. Data base entry 96a also records presence and location attributes for recipient (1). Presence and location attributes may, for example, indicate the status of a recipient, one or more geographic location at which a recipient may be found, and the times during which the recipient is at the specified location(s). The term "status" may refer to any characteristic of a recipient, such as whether the recipient is on-line or not.

A data base entry 96b records redemption and preference attributes for a recipient (2). Data base entry 96b also records presence and location attributes for recipient (2). A data base entry 96n records redemption and preference attributes for a recipient (n). Data base entry 96n also records presence and location attributes for recipient (n). The annotation "n" is intended to indicate that originator data base 94 can accommodate any number of recipients (n) in a like number of data base entries 96n. As mentioned above, originator data base 94 is exemplary; the particular structure of the data base used to record customer or recipient preferences is not restricted or limited to the form or format described herein. Any data base structure that permits storage and recovery of information relating to recipient redemption and preferences attributes, recipient presence and location attributes or other attributes that allow message originators to target the broadcast of messages is appropriate for use in implementing the system and method of the present invention.

Subscription data base 90 and originator data base 94 are illustrated herein as separate data bases by way of example and in order to present a simplified explanation of the present invention. Subscription data base 90 and originator data base 94 may be embodied in a single data base if desired without departing from the scope of the present invention.

By way of further example, redemption and preference attributes may include the redemption and buying habits of recipients. Some specific examples of redemption and preference attributes: 3 action-adventure movies, 1 Clint Eastwood movie, 5 movies with a 10% discount. Presence and location attributes may include, for example, historical or real time accounts of presence and location. Some specific examples of presence and location attributes: "available" presence, within 5-mile radius of movie theater, within 10598 zip code. "Available" presence indicates, for example, that a recipient is contemporaneously on-line and able to receive messages. A recipient may have a presence that avails his receiving messages, but at a later time than the time of transmission of a particular message.

It should be understood that many other types of attributes are possible, including privacy, message count, and others. The universe of possible messages, based on the specific application and desired outcomes determines the definition of the attributes best employed for implementing the system and method of the present invention in a particular situation.

Figure 4:
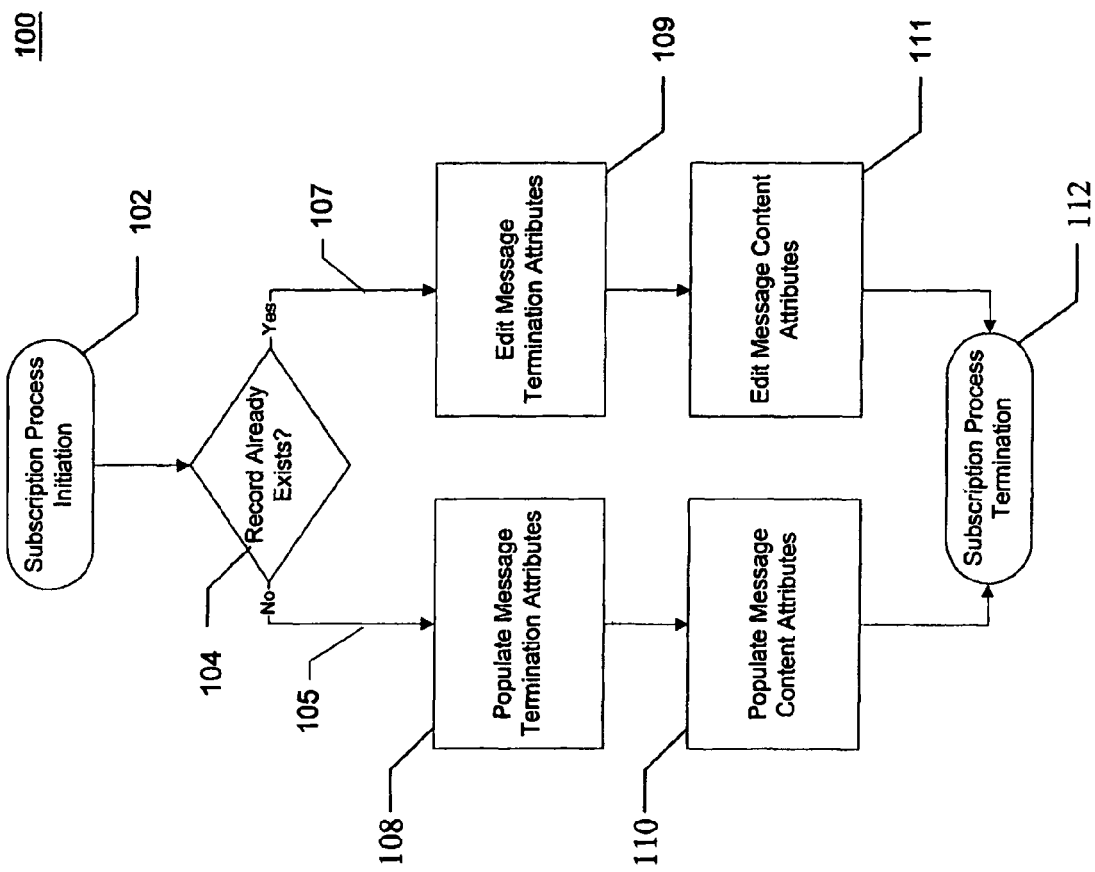
FIG. 4 is a flow chart illustrating an exemplary subscription process for use with the present invention.

FIG. 4 is a flow chart illustrating an exemplary subscription process for use with the present invention. In FIG. 4, a subscription process 100 is described that is appropriate for populating and editing a subscription data base (e.g., subscription data base 90; FIG. 2) according to the preferred embodiment of this invention. Process 100 begins at a subscription process initiation locus, as indicated by a box 102. Process 100 continues by posing a query: "Does the record already exist?", as indicated by a query block 104. If the response to the query posed by query block 104 is "No", then process 100 is a new subscriber entry process and process 100 therefore continues along NO response line 105 to a step by which the subscriber populates message termination attributes in the subscription data base, as indicated by a block 108. Process 100 continues by the subscriber populating the message content attributes in the subscription data base, as indicated by a block 110. Process 100 continues from block 111 by terminating, as indicated by a block 112.

If the response to the query posed by query block 104 is "Yes", then process 100 is an editing process and process 100 therefore continues along YES response line 107 to a step by which the subscriber edits message termination attribute entries recorded in the subscription data base, as indicated by a block 109. Process 100 continues by the subscriber editing message content attribute entries recorded in the subscription data base, as indicated by a block 111. Process 100 continues from block 106 by terminating, as indicated by a block 112.

Figure 5:
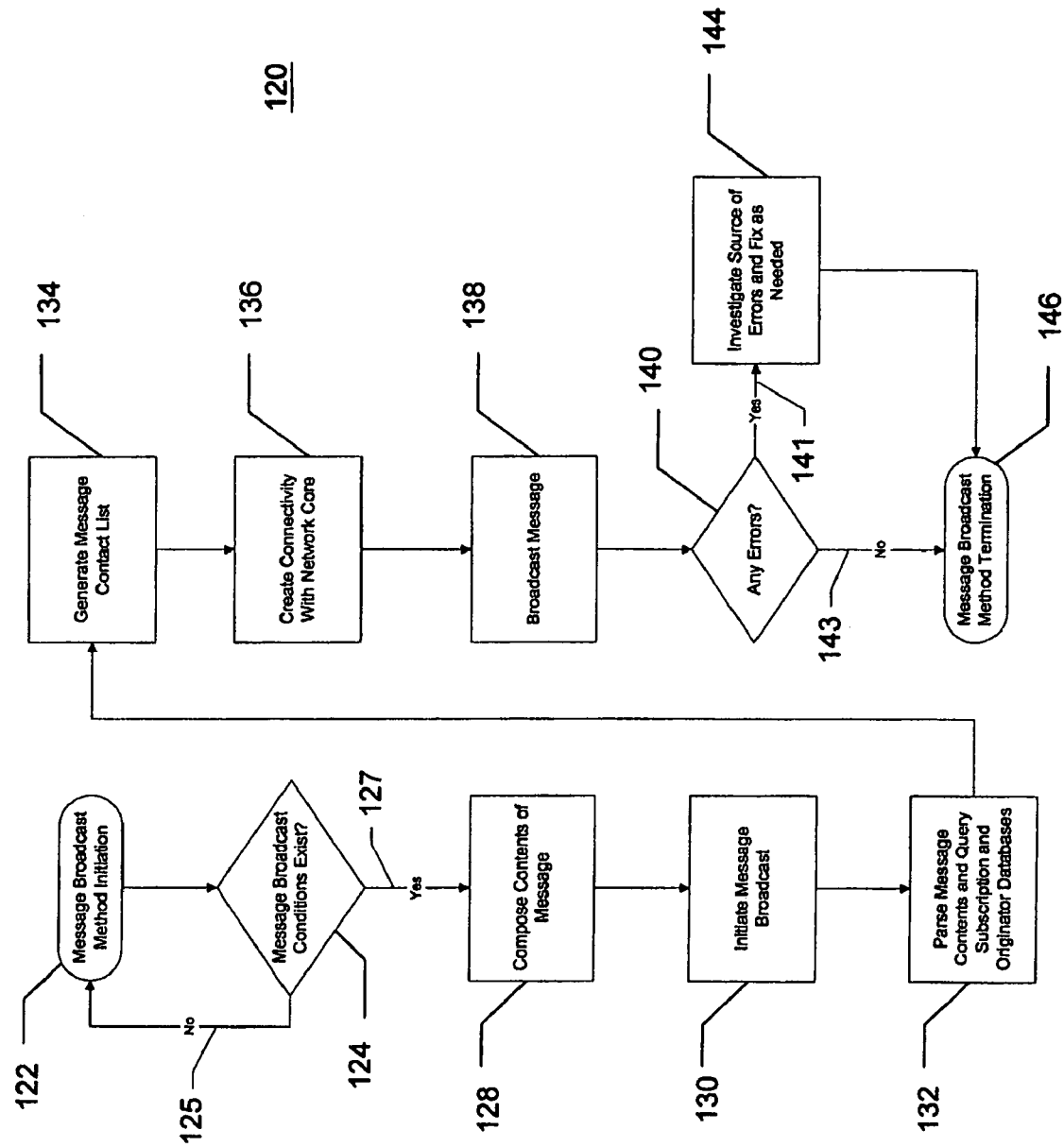
FIG. 5 is a flow chart illustrating a first embodiment of the message broadcast method of the present invention.

FIG. 5 is a flow chart illustrating a first embodiment of the message broadcast method of the present invention. In FIG. 5, a method 120 begins at a message broadcast method initiation locus, as indicated by a block 122. Process 120 continues by posing a query, "Do message broadcast conditions exist?", as indicated by a query block 124. The query posed by query block 124 is intended to ascertain whether a condition exists that warrants the transmission of a broadcast message (e.g., a movie will be shown where tickets are available for perishable seats). If the response to the query posed by query block 124 is "No", then process 120 proceeds along NO response line 125 to return to initiation locus 122 and process 120 restarts. If the response to the query posed by query block 124 is "Yes", then process 120 proceeds along YES response line 127 to a step by which the contents of the message to be transmitted are composed, as indicated by a block 128. Process 120 continues with the step of initiating the broadcast message, as indicated by a block 130.

Process 120 next parses the message contents and queries the subscription and originator data base(s), as indicated by a block 132 to determine how the message contents compare with the preferences of respective recipient/subscribers having information on record in the data base(s). Process 120 then proceeds to use the comparison information resulting from the step represented by block 132 to generate a message contact list appropriate for the message being processed for transmission, as indicated by a block 134. Process 120 proceeds next to establish appropriate connectivity with an associated communication network core pursuant to the contact list developed pursuant to the step represented by block 134, as indicated by a block 136. Connectivity is established with the communication network based upon one or more factors developed pursuant to the steps represented by blocks 132, 134. For example, connectivity will be established for reaching only those recipients/subscribers who have indicated a desire to receive the message, given the contents of the message. Further, the technical capabilities of respective recipients/subscribers to receive messages in a format in which the message being processed may be transmitted will determine which recipients/subscribers are able to receive the message. This technical issue of capability to receive a given message format directly affects performance of the step indicated by block 136 in that it dictates specific connectivity arrangements to be effected with the communication network. Other attributes such as time of delivery restraints and other factors may also be involved in performing steps represented by blocks 132, 134, 136.

Process 120 then proceeds to transmitting or broadcasting the message being processed, as indicated by a block 138. Transmission is effected to recipients who "qualify" or are permitted under criteria contained in subscription and originator data base(s) and who can be reached with a format to be used for transmitting the message (blocks 132, 134). Connectivity is established (block 136) with a communication network using all appropriate message format-capable network elements necessary to reach the most permitted or "qualified" recipients possible.

Process 120 then checks for any errors that may have occurred, as indicated by a decision block 140. If there were any errors, then process 120 proceeds along YES response line 141 to investigate and fix sources of error, as indicated by a block 144. Process 120 then proceeds to terminate, as indicated by a block 146. If there are no errors discovered pursuant to the step indicated by decision block 140, process 120 proceeds via NO response line 143 directly to termination, as indicated by block 146.

Figure 6:
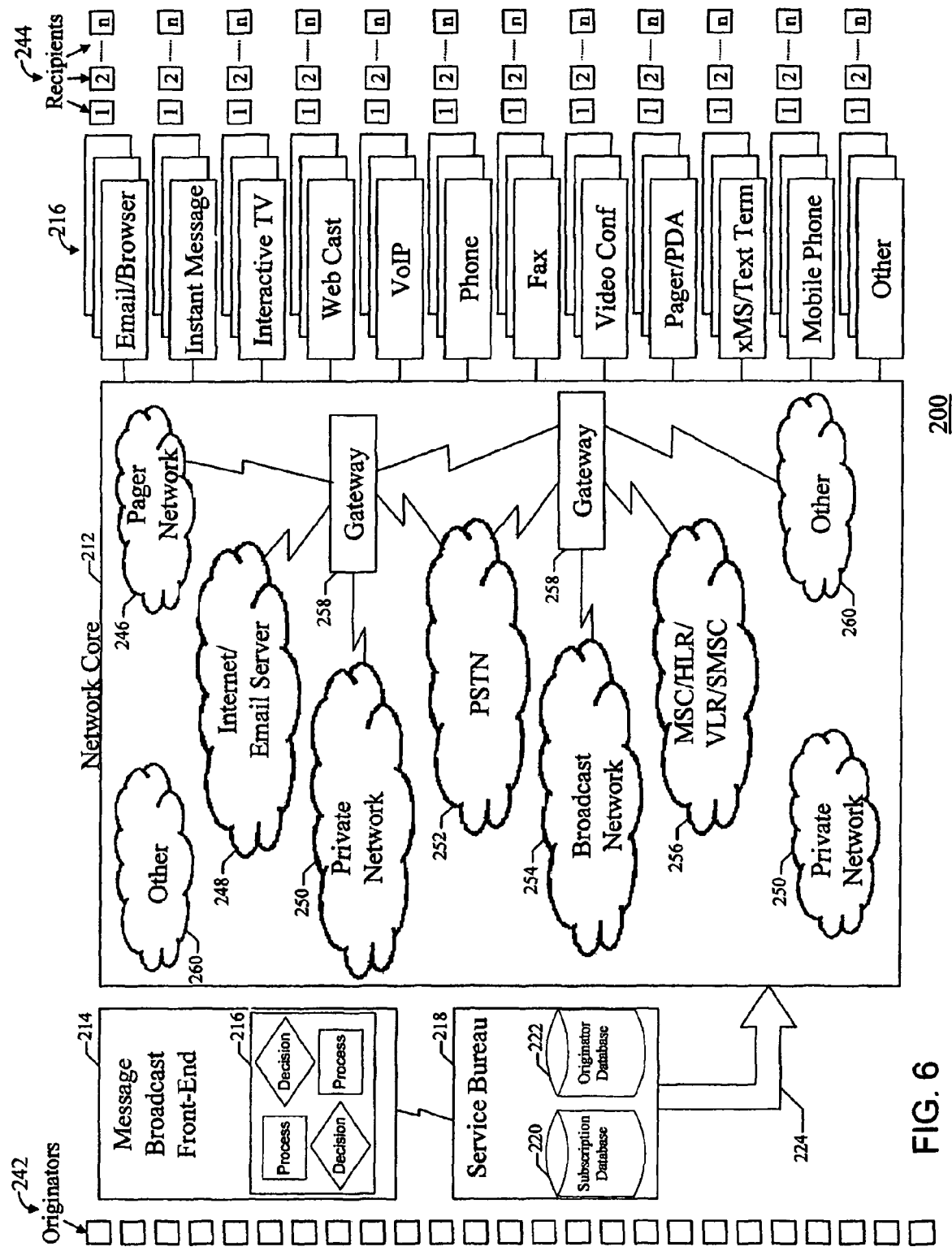
FIG. 6 is a schematic block diagram of the preferred embodiment of the message broadcast communication system of the present invention.

FIG. 6 is a schematic block diagram of the preferred embodiment of the message broadcast communication system of the present invention. In FIG. 6, a message broadcast communication system (MBCS) 200 enables originators 242 (e.g., retail establishments) to broadcast messages on a one-to-one and one-to-many basis to recipients 244 (e.g., customers or consumers). A respective recipient 244 may receive message traffic for 1, or 2 or n number of customers or consumers.

MBCS 200 includes a network core 212 connected with a message broadcast front-end unit 214, a service bureau 218, and a plurality of message termination elements 216. Message broadcast front-end 214 includes equipment such as software and computing hardware appropriate for practicing a message broadcast method 216 (e.g., message broadcast process 120; FIG. 5). Service bureau 218 includes a subscription data base 220 and an originator data base 222. As mentioned earlier in connection with describing FIGS. 2 and 3, subscription data base 220 and originator data base 222 may be embodied in a single data base. Network core 212 components include a pager network 246, an Internet/email server 248, a plurality of private networks 250, a PSTN (public switched telephone network) 252, a broadcast network 254, a MSC/HLR/VLR/SMSC (mobile switching center/home location register/visitor location register/short message service center) 256, a plurality of gateways 258, and other network core components 260. Various network service providers (not shown in detail in FIG. 6) may participate in operating the several network components 246, 248, 250, 252, 254, 256, 258, 260. Back office connectivity 224 provides appropriate operational interfaces between service bureau 218 and network core 212.

The preferred embodiment of the system of the present invention contemplates a single source for all the required connectivity with network core 212. Such an arrangement precludes originators 242 from striking separate agreements with various network service providers in network core 212. An additional advantage with such an arrangement is that message filtering and targeting are transparent. That is, characterizing predetermined attributes of messages and comparing those attributes with preferences in subscription data base 220 and originator data base 222 to determine transmission mode(s) and addressees for broadcast messages may be automatically accomplished regardless of the particular network provider in network core 212 that will participate in delivering the message to a particular recipient 244.

FIG. 7 is a flow chart illustrating a second embodiment of the message broadcast method of the present invention. In FIG. 7, a method 300 for effecting delivery of a message from an originator to a plurality of authorized receivers is illustrated. The message is initiated by the originator in an original message format. Each respective authorized receiver of the plurality of authorized receivers receives the message in a respective reception message format. Method 300 begins at a START locus 302 and proceeds with the step of composing the message, as indicated by a block 304. Method 300 continues by characterizing the message for addressing, as indicated by a block 306. The characterizing indicates at least one feature of the message. Method 300 continues with the step of addressing the message according to the characterizing pursuant to information provided in a data base, as indicated by a block 307. The data base identifies particulars relating to each respective authorized receiver. The addressing (block 307) is carried out by selecting an addressee, as indicated by a block 308. Addressing continues with checking particulars relating to the message, as indicated by a block 310. A query is posed inquiring whether the particulars and the desires of the addressee being considered match, as indicated by a query block 312. If the particulars of the message and the desires of the respective addressee do not match, method 300 proceeds along NO response line 314. Another query is posed inquiring whether the respective addressee is the last addressee to be considered, as indicated by a query block 316. If the respective addressee is not the last addressee to be considered, method 300 proceeds along NO response line 318 to return to block 308 so that another respective addressee can be selected and method 300 may proceed from block 308 anew regarding the newly selected respective addressee.

If the particulars of the message and the desires of the respective addressee match, method 300 proceeds from query block 312 along YES response line 322 and the respective addressee is established as a permitted addressee to be a recipient of the message, as indicated by a block 324. Method 300 proceeds from block 324 to query block 316 to determine whether the respective addressee is the last addressee to be considered (block 316). If the respective addressee is the last addressee to be considered, then method 300 proceeds from query block 316 via YES response line 320 and the message (now with all permitted addressees accumulated as message addressees, as indicated by dotted line 321) is transmitted to respective permitted addressees or receivers in appropriate reception message format for each respective permitted addressee, as indicated by a block 328. Method 300 proceeds from block 328 to end, as indicated by an END locus 330. The particulars of the message that are compared with addressees' desires (blocks 310, 312) include the appropriate respective reception message format for each respective permitted receiver.

It is to be understood that, while the detailed drawings and specific examples given describe preferred embodiments of the invention, they are for the purpose of illustration only, that the apparatus and method of the invention are not limited to the precise details and conditions disclosed and that various changes may be made therein without departing from the spirit of the invention which is defined by the following claims:

I claim:

1. A method, in a message broadcast system, for delivering a message to a plurality of recipients, comprising:
   receiving a message from an originator;
   identifying a set of attributes associated with the message;
   identifying a set of recipients for the message, wherein the identifying a set of recipients includes:
      for each recipient in a set of potential recipients,
         comparing message filtering criteria of the recipient with one or more attributes in the set of attributes associated with the message, wherein message filtering criterion includes a present connectivity status of the recipient; and
         adding the recipient to the set of recipients for the message responsive to a determination that the one or more message filtering criteria of the recipient matches the one or more attributes in the set of attributes associated with the message; and
   transmitting the message to each recipient in the set of recipients.

2. The method of claim 1, wherein step the identifying a set of attributes associated with the message further comprises:
   identifying a set of delivery criteria associated with the originator; and adding the set of identified delivery criteria to the set of attributes.

3. The method of claim 1, wherein a message filtering criterion includes the geographic location of the recipient.

4. The method of claim 1, wherein a message filtering criterion includes desired redemption attributes of the recipient.

5. The method of claim 4, wherein a message filtering criterion includes a historical account of past redemption activities.

6. The method of claim 1, wherein the identifying a set of attributes associated with the message further comprises:
   parsing the content of the message received from the originator to identify one or more content attributes of the message; and
   adding the one or more content attributes to the set of attributes associated with the message.

7. The method of claim 4, wherein a content attribute is whether the message received from the originator is an advertisement.

8. The method of claim 1, wherein a message filtering criterion includes the message formats supported by the recipient.

9. The method of claim 1, wherein the transmitting the message to each recipient in the set of recipients comprises:
   translating the message to a format acceptable to a recipient in the set of recipients; and
   transmitting the translated message to the recipient.

10. The method of claim 1, further comprising:
    receiving one or more message filtering criteria from a potential recipient; and
    updating a database record for the potential recipient with the one or more message filtering criteria received from the potential recipient.

11. A computer-readable storage medium having stored thereon computer executable instructions, execution of which by a computing device causes the computing device to perform operations for delivering a message to a plurality of recipients in a message broadcast system, the operations comprising:
    receiving a message from an originator;
    identifying a set of attributes associated with the message;
    identifying a set of recipients for the message, wherein the identifying a set of recipients includes:
      for each recipient in a set of potential recipients:
        comparing message filtering criteria of the recipient with one or more attributes in the set of attributes associated with the message, wherein a message filtering criterion includes a present connectivity status of the recipient; and
        adding the recipient to the set of recipients for the message responsive to a determination that the one or more message filtering criteria of the recipient matches the one or more attributes of the set of attributes associated with the message; and
    transmitting the message to each recipient in the set of recipients.

12. The computer-readable storage medium of claim 11, wherein the operation of identifying a set of attributes includes:
    identifying a set of delivery criteria associated with the originator; and
    adding the set of identified delivery criteria to the set of attributes.

13. The computer-readable storage medium of claim 11, wherein a message filtering criterion includes the geographic location of the recipient.

14. The computer-readable storage medium of claim 11, wherein a message filtering criterion includes desired redemption attributes of the recipient.

15. The computer-readable storage medium of claim 11, wherein the operation of identifying a set of attributes further comprises:
    parsing the content of the message received from the originator to identify one or more content attributes; and
    adding the one or more content attributes to the set of attributes associated with the message.

16. The computer-readable storage medium of claim 11, wherein a content attribute is whether the message received from the originator is an advertisement.

17. The computer-readable storage medium of claim 11, wherein a message filtering criterion includes the message formats supported by the recipient.

18. The computer-readable storage medium of claim 11, wherein the operation of transmitting the message comprises:
    translating the message to a format acceptable to a recipient; and
    transmitting the translated message to the recipient in the format acceptable to the recipient.

19. A message broadcast system comprising:
    a recipient database configured to store, for each recipient in a set of potential recipients, message filtering criteria for the recipient, wherein a message filtering criterion includes a present connectivity status of the recipient;
    a message broadcast processor configured to receive a message from an originator, to identify a set of attributes associated with the message, to identify from the set of potential recipients in the recipient database a set of recipients for the message, including, for each recipient of the set of potential recipients, (i) comparing message filtering criteria of the recipient in the recipient database with one or more attributes in the set of attributes associated with the message, wherein the message filtering criterion includes the present connectivity status of the recipient, and (ii) adding the recipient to the set of recipients for the message responsive to a determination that the one or more message filtering criteria of the recipient matches the one or more attributes of the set of attributes associated with the message received from the originator, and to transmit the message to each recipient in the set of recipients.

20. The message broadcast system of claim 19, wherein the message broadcast processor is further configured to:
    identify a set of delivery criteria associated with the originator; and
    add the set of identified delivery criteria to the set of attributes stored in the recipient database.

21. The message broadcast system of claim 19, wherein the message broadcast processor is further configured to:
    receive one or more message filtering criteria from a potential recipient; and
    update a database record for the potential recipient in the recipient database.

22. The message broadcast system of claim 19, wherein the message broadcast processor is further configured to:
    translate the message to a format acceptable to a recipient in the set of recipients; and
    transmit the translated message to the recipient in the format acceptable to the recipient.

23. The message broadcast system of claim 19, wherein a message filtering criterion includes the geographic location of the recipient.

24. The message broadcast system of claim 19, wherein a message filtering criterion includes desired redemption attributes of the recipient.

25. The message broadcast system of claim 24, wherein a message filtering criterion includes a historical account of past redemption activities.

26. A message broadcast system comprising:
   a recipient database configured to store, for each recipient of a set of potential recipients, message filtering criteria for the recipient, wherein a message filtering criterion includes a present connectivity status of the recipient; and
   message broadcast means for receiving a message from an originator, identifying a set of attributes associated with the message, identifying a set of recipients for the message, including, for each recipient of the potential recipients, (i) comparing the message filtering criteria of the recipient stored in the recipient database with one or more attributes in the set of attributes associated with the message, and (ii) adding the recipient to the set of recipients for the message responsive to a determination that the one or more message filtering criteria of the recipient matches the one or more attributes of the set of attributes associated with the message, and transmitting the message to each recipient in the set of recipients.

* * * * *